Feb. 15, 1966

C. J. KELMERS 3,235,334

PROCESS AND APPARATUS FOR CARBON BLACK PRODUCTION

Filed June 11, 1962

INVENTOR.
C. J. HELMERS

BY

*Young & Quigg*

ATTORNEYS

Feb. 15, 1966   C. J. KELMERS   3,235,334
PROCESS AND APPARATUS FOR CARBON BLACK PRODUCTION
Filed June 11, 1962   2 Sheets-Sheet 2

INVENTOR.
C. J. HELMERS
BY
ATTORNEYS

United States Patent Office 3,235,334
Patented Feb. 15, 1966

3,235,334
PROCESS AND APPARATUS FOR CARBON BLACK PRODUCTION
Carl J. Helmers, Bartlesville, Okla., assignor to Phillips Petroleum Company, a corporation of Delaware
Filed June 11, 1962, Ser. No. 201,652
12 Claims. (Cl. 23—209.4)

This invention relates to a process for making carbon black and especially to a process for making relatively low structure furnace carbon black. In one aspect it relates to a two-stage process for the production of carbon black, the first stage being conducted in a nonoxidizing atmosphere and the second stage in an oxidizing atmosphere. In another aspect this invention relates to an improved carbon black made in a two-stage process, the first stage being fuel rich and the second stage fuel lean. In another aspect this invention relates to apparatus for manufacturing carbon black.

"Structure" of a carbon black relates to characteristics affecting flocculation of the carbon black particles. The structure is said to be high when there is a strong tendency for the particles to form chains of particles and, conversely, the structure is said to be low when there is little tendency to form such chains.

"High structure" carbon black is generally considered to be one having an oil absorption of about 1.35 to 1.45 and this is a usual range for furnace blacks. "Normal structure" is considered to be about 0.75 to 1.2 and has generally been made by the channel black process. "Low structure" is considered to be about 0.45 to 0.55 and is made by the thermal process. Recently, however, furnace blacks having relatively low structure for blacks of this type have been marketed. These blacks have, in some instances, proved to be useful in applications formerly served by channel blacks, for example, in reinforcing natural rubber products, and in specific application, for example, in nonsqueal, soft-riding automobile tires. These blacks often are designated "low structure" blacks because they are lower than normal for blacks made by the furnace process, even though their oil absorption values fall in the upper portion of the range of blacks generally designated as "normal structure," or in the range between "normal" or "high" structure. By the practice of my invention, blacks having a structure lower than is usual for furnace blacks using the same feed and having the same particle size can be made. These blacks generally have an oil absorption in the range of about 0.9 to about 1.2 and are useful in reinforcing natural and synthetic rubbers. All of the above figures for oil absorption are for unpelleted black. Working tends to reduce this value and pelleted blacks have values approximately 0.1 lower in all ranges. The above values for oil absorption are in cc./grams.

It is also desirable in many applications to have a black having small particle size, since particle size can be correlated with reinforcing characteristics. It is desirable to be able to control the value of oil absorption and particle size.

An object of my invention is to produce relatively low structure carbon black in a furnace process.

Another object of my invention is to produce relatively low structure carbon black having relatively small particle size.

Another object of my invention is to produce furnace carbon blacks having controlled structure and particle size.

Other aspects, objects and advantages of my invention are apparent in the written description, the drawing and the claims.

According to my invention carbon black is produced from a hydrocarbon reactant by pyrolysis of a reactant hydrocarbon in two stages, the first stage being accomplished in a nonoxidizing atmosphere while the second stage is accomplished in an oxidizing atmosphere. The nonoxidizing atomsphere can be provided by heating with a nonoxidizing gas or by surrounding the reactant hydrocarbon with a nonoxidizing atmosphere to separate the reactant from the heating gases. The nonoxidizing atmosphere can be supplied by reducing gases. Hot gases providing a reducing atmosphere can be supplied by burning a normally gaseous fuel with up to about 80 percent of the stoichiometric amount of a free oxygen-containing gas. For example, a fuel gas can be a residue natural gas and the free oxygen-containing gas can be air, in which case the stoichiometric ratio of air to gas is about 10 and the preferred ratio is between about 6 and about 8. A reducing atmosphere of hot gases also can be produced by burning a fuel with sufficient free oxygen-containing gas to produce a readily combustible mixture and injecting additional fluid into the resulting combustion products to produce a mixture containing at least about 20 percent of excess fuel. This procedure is particularly useful when the fluid is normally liquid and difficulty is found in maintaining combustion at the rich mixture desired. Where my invention is practiced by providing a protective sheath around the reactant, the sheath can be formed of gas made as described above by burning with an excess of fuel or by adding fuel to combustion products or can be a gas such as unburned natural gas or other reducing gas. The oxidizing gas can be air or combustion products containing excess air or any gas containing free oxygen. Preferably, the oxidizing gas contains from 20 to 100 percent free oxygen and the oxidizing atomsphere maintained in this zone contains at least about 20 percent excess oxygen.

My invention is distinguished from oxidative after-treatment of carbon black by the fact that an appreciable portion of the actual conversion to carbon black occurs in the second stage. Similarly, my invention is distinguished from processes in which a hydrocarbon reactant is heat treated, such as for cracking, prior to the carbon black-producing step in that an appreciable portion of the carbon black is formed in the first stage under a reducing atmosphere, Preferably from 20 to 80 percent of the total conversion to carbon black occurs in the first stage, the remaining 80 to 20 percent occurring in the second stage. By conversion is meant the actual production of carbon black. That is, for example, in the first stage, actual carbon black is formed and the remainder of the reactant may be converted to products differing from the feed, for example, cracked gases and tarry materials. Therefore, the conversion to carbon black which occurs in the second stage can be either conversion of a portion of the reactant hydrocarbon which passes through the first stage entirely unchanged or it can be a conversion to carbon black of products resulting from a partial conversion of the reactant hydrocarbon in the first stage. The beginning of the second stage is determined by the location at which the oxidizing gas is introduced. The degree of conversion existing at this point is determined by a number of factors, including the temperature maintained in the first stage and the residence time of the reactant in the first stage. Residence time is affected by the size of the first stage zone, the throughput rate, the position of the injection of the oxidizing gas to delimit the first stage, etc.

My invention can be carried out in a single cylindrical reaction zone into which the reactant is injected axially at one end and a hot reducing gas, such as the products of combustion described above, introduced tangentially near the same end and with an oxidizing gas introduced at a point within the chamber downstream of the introduction of the nonoxidizing gas. My invention also can be practiced by utilizing a first cylindrical zone having a diameter greater than its length and a second cylindrical zone coaxial with the first zone but having a length greater than its diameter and a diameter smaller than the diameter of the first zone, by injecting a reactant axially and a hot reducing gas tangentially into the first zone, a swirling mass of gases passing into the second zone, and injecting an oxidizing gas tangentially into the second zone.

As noted above, the second stage of conversion to carbon black begins at the point at which an oxidizing gas is first introduced in contact with the reactant. For example, where the reactant is protected by a sheath surrounding it in the first zone, the hot gases introduced in the first zone surrounding the sheath can be oxidizing gases, but where streamlined flow is maintained through the first zone the reactant does not contact the oxidizing gas until the second stage. Thus, the second stage can occur simply as a result of allowing the surrounding oxidizing gas to contact the reactant by penetration of the sheath. The penetration usually is by turbulence but can be by diffusion through the protective sheath.

The oxidizing gas can be introduced at a single downstream point or can be introduced at a plurality of points spaced longitudinally along the reaction zone.

My invention also can be carried out utilizing a first zone having a diameter greater than its length, a coaxial second zone having a length greater than its diameter and a diameter less than that of the first zone, a coaxial third zone having a diameter greater than its length and a diameter greater than the second zone, and a coaxial fourth zone having a length greater than its diameter and a diameter less than that of the third zone, by introducing the reactant axially into the first zone, maintaining the reactant in contact with a nonoxidizing atmosphere in the first zone, and introducing an oxidizing gas in the third zone to initiate the second stage of conversion wherein the reactant is in contact with an oxidizing atmosphere.

Further according to my invention, there is provided apparatus especially adapted for the production of carbon black in consecutive reducing atmosphere and oxidizing atmosphere stages.

Figure 1:
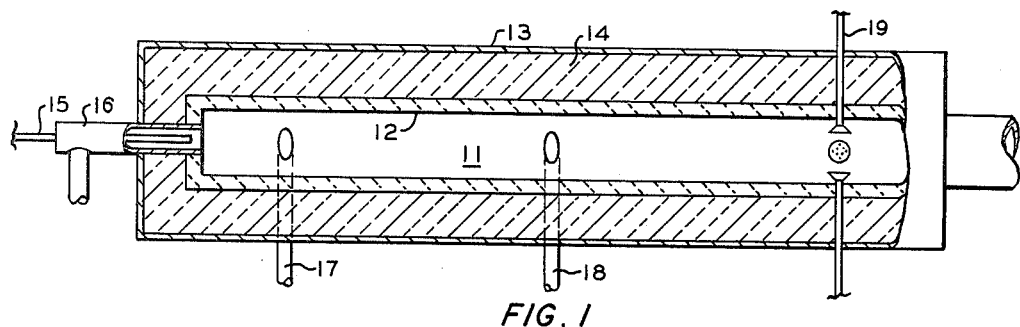
FIGURE 1 is a vertical cross section of a reactor comprising a single cylindrical reaction chamber.

In the apparatus illustrated in FIGURE 1, a single elongated cylindrical chamber 11 is formed by a lining 12 of highly refractory material such as sillimanite, alumina, or other refractory material suitable for the temperatures encountered, a cylindrical steel shell 13, and a layer of insulation 14. In the upstream or inlet end wall of chamber 11, there is a feed pipe 15 arranged axially so that feed introduced therethrough passes axially into the furnace. A larger pipe 16 can be provided surrounding feed pipe 15, thus defining an annular space through which a fluid can be introduced into the furnace surrounding the reactant feed stream. At least one inlet 17 is provided into that portion of chamber 11 near inlet feed pipe 15. Each tangential inlet 17 provides means for the introduction of a heating gas into this portion of the reaction zone. The heating gas can be a gas which is heated by indirect heat exchange, or a gas comprising hot combustion products, or can be a combustible mixture which is burned in the reaction zone. At least one additional inlet 18 is provided a finite distance longitudnally downstream from the inlet 17. Preferably quench inlets 19 are provided near the discharge end of chamber 11.

One method for the utilization of the apparatus of FIGURE 1 for the practice of my invention includes the introduction of a hydrocarbon reactant through feed inlet 15 continuously while, at the same time, a hot nonoxidizing gas is introduced to inlet 17 and an oxidizing gas introduced continuously through inlet 18. This results in the conversion of the hydrocarbon reactant to carbon black partially in the first portion of chamber 11, the boundary of the first portion being defined by the location of inlet 18, and the further conversion to carbon black in the second portion, downstream of inlet 18.

In another method according to my invention, an annular sheath is formed around the reactant hydrocarbon by a nonoxidizing gas introduced through the annular space between feed inlet pipe 15 and larger pipe 16. A heating gas is introduced through inlet 17 but is prevented from contacting the reactant hydrocarbon by the protective sheath thereabout. As long as streamline flow is maintained in this section of the furnace the conversion of the reactant to carbon black occurs primarily by heat radiated through the protective sheath. Sufficient oxidizing gas is introduced through inlet 18 to cause turbulent flow beyond this point and results in an oxidizing atmosphere coming in contact with the remaining unconverted, that is unconverted to carbon black, reactant. Further carbon black is produced in the second portion, downstream of inlet 18. In another method of the operation of the apparatus of FIGURE 1, according to my invention, the reactant hydrocarbon is injected through pipe 15 and a protective sheath formed by the injection of a reducing gas through the annular space between pipe 15 and pipe 16 and an oxidizing heating gas introduced through inlet 17, inlet 18 being closed. The rates of flow of the various components are adjusted to maintain streamline flow through chamber 11. However, the oxidizing gas gradually diffuses through the protective sheath and with the reactant hydrocarbon, thereby causing the conversion in the downstream portion of chamber 11 to be in contact with an oxidizing gas.

Figure 2:
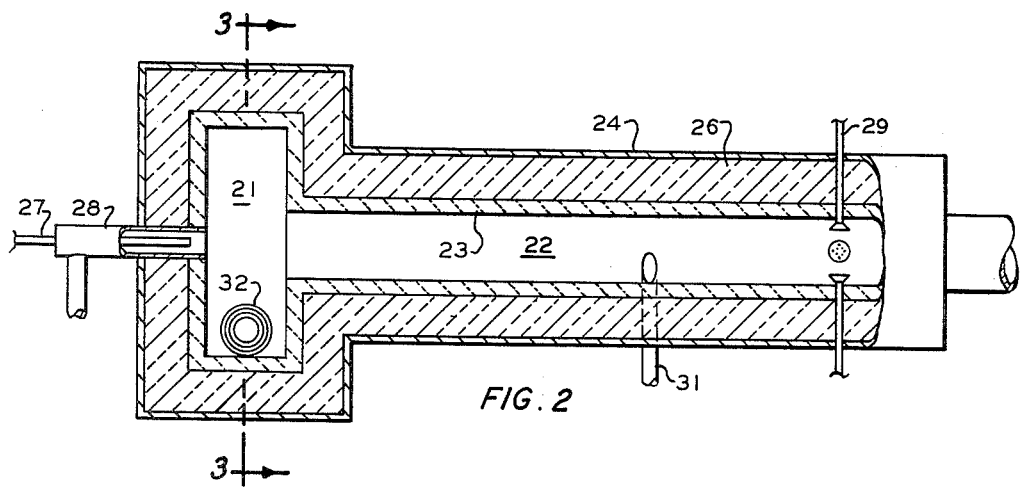
FIGURE 2 is a vertical cross section of a reactor comprising a large diameter first chamber and a small diameter elongated second chamber coaxial with the first.
Figure 3:
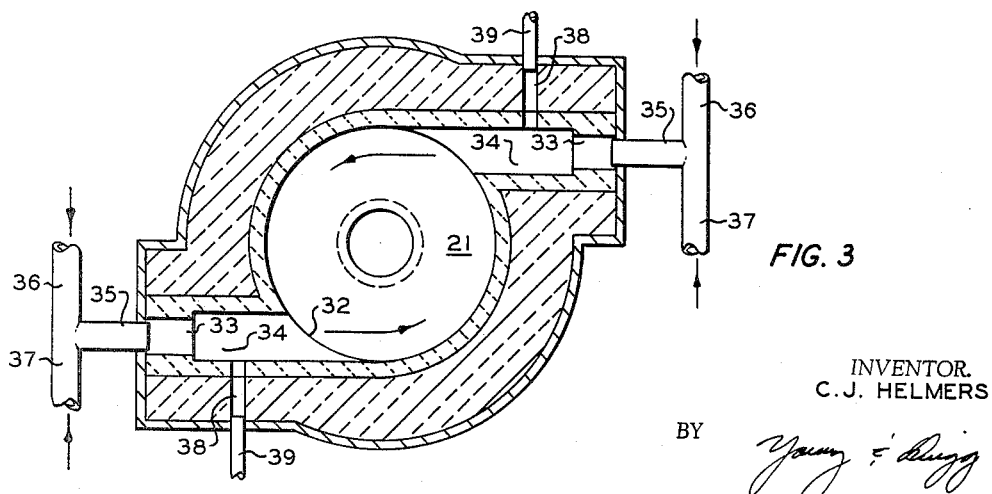
FIGURE 3 is a cross section along the line 3—3 of FIGURE 2.

In the apparatus of FIGURE 2 a first cylindrical chamber 21, having a diameter greater than its length, and a second cylindrical chamber 22, having a length greater than its diameter and a diameter less than that of chamber 21, are provided inside a lining 23 of highly refractory material, separated from a steel shell 24 by a layer of insulation 26. Feed inlet pipe 27 and a surrounding pipe 28 are provided similar to feed pipe 15 and pipe 16 of FIGURE 1. Quench inlets 29 are similar to quench inlets 19 of FIGURE 1, and oxidizing gas inlet 31 is similar to inlet 18 of FIGURE 1. One or more inlets 32 are provided in chamber 21 as illustrated more clearly in FIGURE 3. Each inlet 32 is disposed so that gas passing therethrough into chamber 21 does so in a direction tangent to the cylindrical wall. Each inlet 32 is connected with a combustion chamber 33 and a conduit 34, the latter terminating in opening 32. A pipe 35 extends part way into combustion chamber 33. Separate conduits 36 and 37 are provided for supplying heating fuel and an oxygen-containing gas, respectively, to pipe 35. An inlet 38 is provided for additional fuel, which can be supplied through pipe 39. In operation, a suitable fuel is fed through pipes 37, mixes with a free oxygen-containing gas supplied through pipes 36 and a combustible mixture fed through the pipes 35 into combustion chambers 33 where combustion takes place. The hot products of combustion flow through the conduits 34 and inlets 32 and enter chamber 21 tangentially. Although 21 is designated as a combustion chamber, in many instances a substantial amount of combustion also takes place in conduit 34 and some may occur in chamber 21. However, where no protective sheath is provided, the combustion is complete prior to mixing the hot gases with the reactant feed. The reactant enters through pipe 27 axially into chamber 21 and thence axially into chamber 22. Heat is transferred from the rotating hot gases to the axially fed reactant, thus converting the reactant hydrocarbon to carbon black, the heat being transferred by mixing at the interface between the hydrocarbon and the combustion gases or by radiation, or both. Where no protective sheath is provided, the surrounding atmosphere in chamber 21 and the first portion of chamber 22 is a nonoxidizing atmosphere which is changed to an oxidizing atmosphere by the introduction of oxidizing gas through inlet 31, further conversion to carbon black taking place downstream of inlet 31. The products of combustion are quenched by the introduction of a quench fluid, for example water, through quench inlet 29 and the products taken to conventional separation apparatus for separation of the carbon black from gaseous products.

Operation with a protective sheath can be accomplished in several ways. For example, the sheath can be maintained until penetrated by oxidizing gas from inlets 31. Another method of operation with a protective sheath is to introduce oxidizing heating gas through inlet 32 and to rely upon the initiation of turbulent flow as the gases pass from chamber 21 into chamber 22 to convert from an operation in which the reactant is maintained under a reducing atmosphere to one in which the conversion occurs in an oxidizing atmosphere.

Figure 4:
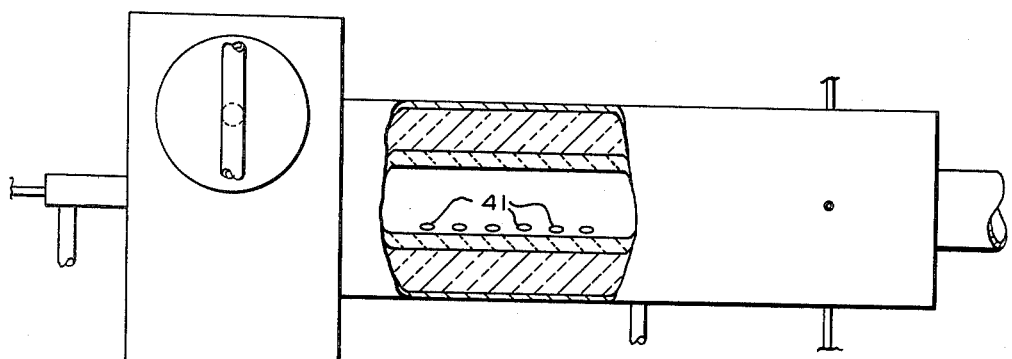
FIGURE 4 is an elevation, partly in cross section, of a reactor similar in configuration to the reactor of FIGURE 2 but having a plurality of oxidizing gas injection openings.

The apparatus of FIGURE 4 is very similar to that of FIGURE 2 except that a plurality of longitudinally spaced inlets 41 are provided in place of the single inlet or inlets at a single longitudinal position as indicated by inlet 31. Inlets 41 also can be spaced peripherially around the chamber 11. That is, at each longitudinal location at which there is an inlet 41 indicated at FIGURE 4, there can be a plurality of such inlets.

Figure 5:
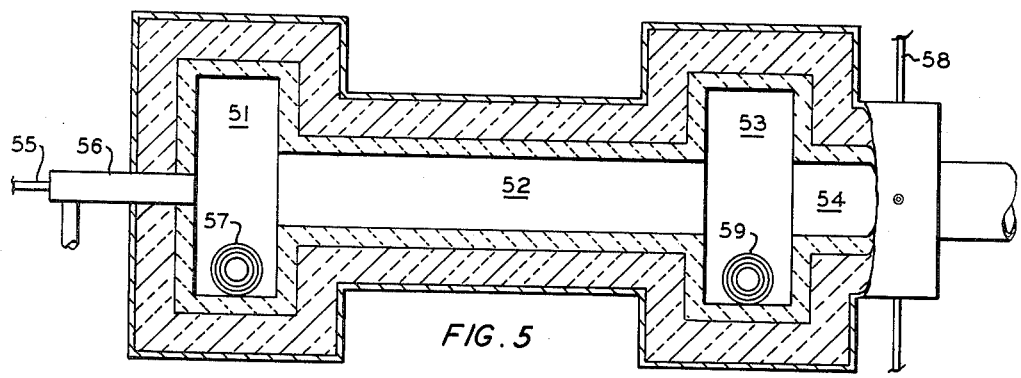
FIGURE 5 is a vertical cross section of a reactor comprising first and third relatively large diameter short chambers and second and fourth relatively small diameter elongated chambers.

FIGURE 5 illustrates apparatus in which a first cylindrical chamber 51 having a diameter greater than its length communicates with a coaxial chamber 52 having a length greater than its diameter and a diameter less than that of chamber 51, and chamber 52 in turn communicates with a coaxial chamber 53 having a diameter greater than its length and a diameter greater than the diameter of chamber 52, and chamber 53 in turn communicates with a coaxial chamber 54 having a length greater than its diameter and a diameter less than that of chamber 53. Fuel and protective sheath inlets 55 and 56, heating gas inlets 57, oxidizing gas inlets 59 and quench inlets 58 are provided. The operation of this furnace is similar to the operation of the furnace of FIGURE 2.

Figure 6:
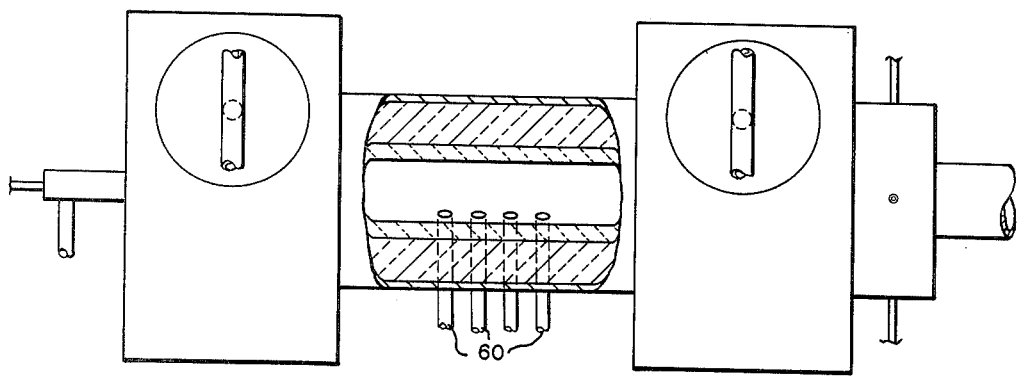
FIGURE 6 is an elevation, partly in cross section, of a reactor similar to that of FIGURE 5 but including additional injection openings for oxidizing gas, spaced longitudinally therein.

FIGURE 6 is similar to the apparatus of FIGURE 5 with the exception that there are provided a plurality of longitudinally spaced oxidizing gas inlets 60.

While carbon black of some sort can be produced from any hydrocarbon, it has been found that the best carbon black for rubber reinforcement is one that has relatively small particle size.

In order to produce such small particle size grades of carbon black in high yield per pound of feedstock, it is preferable to employ a liquid hydrocarbon feedstock as the source of said carbon black. Said liquid hydrocarbon feedstock may be a petroleum distillate, or a petroleum residual oil, or a coal tar distillate, or a coal tar residual oil, it should have a substantial aromatic content, and may be fed in vapor form if substantially vaporizable, or as an atomized spray of droplets into the furnace. With regard to the use of petroleum oils, the following aromatic streams from an oil refinery are used commercially: (1) recycle gas oil from catalytic or thermal cracking; (2) synthetic tars from catalytic or thermal cracking; (3) cracked residues; and (4) vacuum still overhead streams and tarry residuums therefrom; or (5) aromatic streams recovered by solvent extraction of any of these streams (1) to (4).

From a standpoint of economics it is preferred to use liquid feedstocks having a U.S. Bureau of Mines correlation index (BMCI) of at least 80, preferably over 90 and more preferably over 110. The formula used is as follows:

$$\text{BMCI} = \left( \frac{876}{460+F} + \frac{670}{131.5+\text{API}} - 4.568 \right) 100$$

wherein "F" is the boiling point in ° F. at the 50 percent recovery distillation point and "API" is the American Petroleum Institute gravity at 60° F. Also from an economic standpoint the initial boiling point should be at least 170° F,. preferably above 400° F. and most preferably above 550° F. It is preferred that the API gravity should be as low as possible, at least less than 25, preferably less than 10, most preferably 5 and below.

The best feedstock preferably has a low carbon residue and a low pentane insoluble content of less than 5 weight percent for petroleum oils and less than 10 weight percent for coal tars.

The oxygen and/or nitrogen content of the feedstock appears to only reduce the yield and not effect the quality. Sulfur is not objectionable in carbon black from a quality standpoint, but unusually large amounts in carbon black can cause corrosion in the carbon black-producing equipment. It is therefore desirable from a marketing standpoint to use a feedstock with a sulfur content of less than 3 weight percent, preferably less than 1 weight percent. Excessively high sulfur content also can require a change in rubber compounding recipes. However, a reasonable amount, in the above range, is not objectionable.

The ash content of the feedstock should be low, generally below 0.5 weight percent, preferably below 0.2 weight percent, to keep the refractory bricks in the carbon black furnace from fluxing and to help maintain the grit content of the carbon black to a tolerable level.

The viscosity of the feedstock is unimportant except from the standpoint of the difficulties of pumping and spraying.

Of course, virgin crude oil fractions, or aromatic-selective solvent extracts therefrom, can be employed when they have the preferred qualities discussed above, but generally they will be found somewhat lacking in some of these preferred qualities, so that while carbon black may be made from them, they are not preferred as feedstocks for carbon black manufacture.

As an example of one preferred residual feedstock, I may employ an atomized spray of a normally liquid hydrocarbon having a hydrogen-to-carbon atomic ratio below 1.5 and preferably in the range of 0.75 to 1.25; a mean molecular weight above 140 and preferably from 225 to 550; an API gravity less than 20 and preferably less than 10; a viscosity low enough to permit handling, but usually above 30 SUS at 210° F.; and a low Conradson carbon residue, which however may be in excess of 1.5 weight percent, or even in excess of 3 weight percent.

As an example of one preferred distillate feedstock I may employ a recycle gas oil derived from a cracking process and having an API gravity of 16 to 25, an initial boiling point of 400 to 600° F. and an end point of from 600 to 800° F. The carbon residue is generally low, such as 0.21 for example, although the carbon residue is not critical.

Residue gas is a preferred tangential fuel. A typical residue gas has the following analysis:

| | |
|---|---|
| Helium | 0.45 |
| Methane | 78.71 |
| Nitrogen | 9.01 |
| Propane | 3.45 |
| Ethane | 7.82 |
| Isobutane | 0.15 |
| $CO_2$ | 0.32 |
| Normal butane | 0.09 |

However, other fuels can be used. For example, hydrocarbon oils as a spray or vapor, or gases other than natural gas, or mixtures of oil and gas or even powdered solid fuels can be used, but fluids are preferred. Water gas, producer gas, coal gas or even hydrogen can be used but are not preferred. One skilled in the art can readily determine or calculate the amount of air or other oxygen-containing gas necessary for the combustion of a particular fuel when the composition is known. Once the theoretical air-fuel ratio is determined, the operating limits for the practice of my invention for the production of a reduction gas can readily be determined using the limits of about 60 to about 80 percent of the theoretical (stoichiometric) ratio.

The proportions of the furnaces as illustrated should not be considered fixed. Although the drawings are in some instances representations, approximately to scale, of preferred forms, some variation in relative dimensions is permissible. For example, it is usually preferred that the length of chamber 54 in FIGURE 5 and FIGURE 6 be approximately equal to the length of the chamber 52.

EXAMPLE

An axial feed comprising an $SO_2$ extract oil having the following properties

Vacuum distillation, ° F. at 760 mm.:

| | |
|---|---|
| FD | 460 |
| 5% | 563 |
| 10% | 595 |
| 20% | 623 |
| 30% | 648 |
| 40% | 668 |
| 50% | 690 |
| 60% | 712 |
| 70% | 751 |
| 80% | 795 |
| 88% | 868 |

| | |
|---|---|
| BMCI | 90.5 |
| Viscosity: | |
| SUS at 100° F. | 85.3 |
| SUS at 210° F. | 36.0 |
| Carbon, wt. percent | 89.2 |
| $H_2$, wt. percent | 9.5 |
| S, wt. percent | 1.56 |
| Carbon residue, wt. percent | 1.7 |
| $C_5$ insoluble, wt. percent | 0.20 |
| Pour point, F. | +40 |
| API gravity | 10.8 | was fed to a reactor made as illustrated in FIGURE 2. The diameter of chamber 21 was 37 inches and this chamber was 7½ inches long. Chamber 22 was 12 inches in diameter and quench inlets 29 were located 12 feet, 3 inches, from the upstream end of chamber 22. Operating conditions and carbon black properties are set forth in Table I.

Table I

| Run | 1 | 2 |
|---|---|---|
| Oil Rate, gal./hr | 145.6 | 116.9 |
| Oil Preheat, ° F. | 780 | 775 |
| 1st Stage, Tangential: | | |
| Air, M c.f.h | 100 | 100 |
| Gas, M c.f.h | 13.33 | 13.33 |
| Air/Gas Ratio | 7.5 | 7.5 |
| 2nd stage, Tangential: | | |
| Air, M c.f.h | 40 | 40 |
| Gas, M c.f.h | 0 | 2.67 |
| Air/Gas Ratio | | 15 |
| Photolometer | 89 | 91 |
| Calc. Pilot Plant Yield, lb./gal | 3.59 | 4.10 |
| Oil Absorption, cc./g | 0.97 | 0.92 |
| Nitrogen Surface Area, sq. m./g | 64.5 | 55.1 |

Physical properties of natural rubber reinforced with these carbon blacks are given in Table II.

Table II

| Run | 1 | 2 |
|---|---|---|
| Compounded ML–4 at 212° F | 65.6 | 65.5 |
| | Physical Properties (Cured @ 293° F.) | |
| Cross-Link Density, $\mu \times 10^4$, moles/cc.: | | |
| 10' | 1.19 | 1.23 |
| 20' | 1.61 | 1.66 |
| 30' | 1.77 | 1.87 |
| 40' | 1.77 | 1.84 |
| 300% Modulus, p.s.i.: | | |
| 10' | 1,360 | 1,290 |
| 20' | 1,660 | 1,700 |
| 30' | 1,740 | 1,800 |
| 40' | 1,830 | 1,760 |
| 400% Modulus, p.s.i.: | | |
| 10' | 2,250 | 2,125 |
| 20' | 2,715 | 2,700 |
| 30' | 2,785 | 2,810 |
| 40' | 2,885 | 2,785 |
| Tensile, p.s.i.: | | |
| 10' | 4,060 | 4,180 |
| 20' | 4,335 | 4,325 |
| 30' | 3,900 | 4,175 |
| 40' | 3,800 | 4,025 |
| Elongation³ percent: | | |
| 10' | 560 | 600 |
| 20' | 525 | 545 |
| 30' | 490 | 510 |
| 40' | 470 | 505 |

Properties of synthetic rubber reinforced with these blacks is given in Table III.

Table III

| Run | 1 | 2 |
|---|---|---|
| Compounded MS–1½ @ 250° F | 28.8 | 27.1 |
| Extrusion at 250° F.: | | |
| Inches/minute | 32.8 | 32.0 |
| Grams/minute | 105.0 | 103.8 |
| Rating | 10+ | 10+ |
| | Physical Properties (30 Minute Cure at 307° F.) | |
| Crosslink Density, $\nu \times 10^4$, moles/cc | 1.38 | 1.38 |
| Compression Set, percent | 18.3 | 18.4 |
| 300% Modulus, p.s.i | 1,120 | 1,040 |
| Tensile, p.s.i | 2,760 | 2,800E |
| Elongation, percent | 520 | 575E |
| $\Delta T$, ° F | 57.5 | 56.8 |
| Resilience, percent | 62.1 | 61.8 |
| Shore A Hardness | 56 | 56.5 |
| Abrasion Loss, g | 12.84 | 14.96 |
| Abrasion Index | 80 | 68 |
| Oven Aged 24 Hours at 212° F.: | | |
| 300% Modulus, p.s.i | 1,800 | 1,720 |
| Tensile, p.s.i | 2,320 | 2,375 |
| Elongation, percent | 355 | 375 |
| $\Delta T$, ° F | 51.0 | 51.7 |
| Resilience, percent | 69.6 | 68.7 |
| Abrasion Loss, g | 12.86 | 14.67 |
| Abrasion Index | 84 | 73 |

The natural rubber from which the data of Table II were obtained was composed of:

| | Parts by weight |
|---|---|
| #1 smoke sheet | 100 |
| Carbon black | 40 |
| Stearic acid | 3 |
| Zinc oxide | 5 |
| Sulfur | 2.5 |
| Altax 5 (benzothiazyl disulfide) $(C_6H_4NCS)_2S_2$ | 0.6 |

The synthetic rubber was compounded of the following constituents:

| | Constituents in parts by wt. |
|---|---|
| SBR 1000 (ASTM D1419–58T) | 100 |
| Carbon black | 40 |
| Zinc oxide | 3 |
| BRT #7 | 6 |
| Sulfur | 1.75 |
| Santocure (N-cyclohexyl-2-benzythiazyl-sulfonamide) | 0.8 |

BRT #7 is a rubber softener, a refined tar with a high free carbon content having a specific gravity of 1.20 to 1.25, available from Allied Chemical and Dye Corporation.

Throughout this application, the first stage is conducted in a nonoxidizing atmosphere. This includes reducing as well as inert atmospheres. Thus, in the first stage the reactant is maintained in contact with either a reducing or an inert gas, whether by using a nonoxidizing heating gas or sheath.

Reasonable variation and modification are possible within the scope of my invention which sets forth method and apparatus for producing carbon black in consecutive nonoxidizing atmosphere and oxidizing atmosphere stages, and an improved carbon black produced by a two-stage process involving heating under a reducing atmosphere in the first stage and in an oxidizing atmosphere in the second stage.

I claim:

1. A process for producing carbon black, which comprises:
    continuously introducing a hydrocarbon reactant into a first portion of a reaction zone;
    maintaining a nonoxidizing atmosphere around said reactant in said first portion;
    continuously introducing an oxidizing gas into said reaction zone at a boundary location downstream of the location of introduction of said reactant, thereby delimiting said first portion of said zone upstream of said boundary location and a second portion downstream of said boundary location;
    converting said reactant to carbon black in said first and said second portions of said zone, between 20 and 80 percent of the total conversion to carbon black occurring in said first portion and between 80 and 20 percent of the conversion to carbon black occurring in said second portion; and
    recovering said carbon black by separation from said gaseous products 2. A process for producing carbon black, which comprises:
    continuously introducing a hydrocarbon reactant into a first portion of a reaction zone;
    maintaining a reducing atmosphere around said reactant in said first portion, said reducing atmosphere comprising a gas having at least 20 percent excess fuel;
    continuously introducing an oxidizing gas into said reaction zone at a boundary location downstream of the location of introduction of said reactant, thereby delimiting said first portion of said zone upstream of said boundary location and a second portion downstream of said boundary location, and establishing an oxidizing atmosphere in said second portion, said oxidizing atmosphere containing at least 20 percent excess oxygen;
    converting said reactant to carbon black in said first and second portions of said zone, between 20 and 80 percent of the total conversion to carbon black occurring in said first portion and between 80 and 20 percent of the total conversion to carbon black occurring in said second portion; and
    recovering said carbon black by separation from gaseous products.

3. A process for producing carbon black, which comprises:
    continuously introducing a hydrocarbon reactant axially into a first portion of a reaction zone;
    continuously introducing a nonoxidizing gas as a sheath surrounding said reactant;
    continuously introducing a heating gas around said sheath;
    initiating the formation of carbon black from said reactant hydrocarbon in said first portion by pyrochemical action due to the heat of said heating gas while preventing contact of said heating gas with said reactant by said sheath;
    penetrating said sheath and contacting said reactant with an oxidizing gas at a boundary location downstream of the location of introduction of said reactant, thereby delimiting said first portion of said zone upstream of said boundary location and a second portion downstream of said boundary location;
    converting said reactant to carbon black in said first and second portions of said zone, between 20 and 80 percent of the total conversion to carbon black occurring in said first portion and between 80 and 20 percent of the total conversion to carbon black occuring in said second portion; and
    recovering said carbon black by separation from gaseous products.

4. A process for producing carbon black, which comprises:
    establishing in a generally cylindrical first zone, having a diameter greater than its length, a rotating mass of hot gases, said gases forming a reducing atmosphere having at least 20 percent excess fuel;
    continuously passing said gases while rotating into a generally cylindrical second zone, having a length greater than its diameter and a diameter less than that of said first zone;
    continuously injecting at a boundary location into said second zone oxidizing gases comprising free oxygen in the range of 20 to 100 weight percent of said oxidizing gases thereby forming an oxidizing atmosphere having at least 20 percent excess oxygen in said second zone downstream of said boundary location;
    introducing a reactant hydrocarbon along the axis of said first zone;
    initiating the formation of carbon black from said reactant hydrocarbon by pyrochemical action due to the heat of the surrounding gases upstream of said boundary location;
    passing carbon black and reactant hydrocarbon axially across said boundary locations;
    continuing the formation of carbon black in said oxidizing atmosphere in said second zone downstream of said boundary location;
    producing between 20 and 80 percent of the total conversion to carbon black upstream of said boundary location;
    producing between 20 and 80 percent of the total conversion to carbon downstream of said boundary location; and
    recovering said carbon black by separation from gaseous products.

5. A process for producing carbon black, which comprises:
    establishing in a generally cylindrical first zone, having a diameter greater than its length, a rotating mass of hot gases, said gases forming a reducing atmosphere having at least 20 percent excess fuel;

continuously passing said gases while rotating into a generally cylindrical second zone, having a length greater than its diameter and a diameter less than that of said first zone;

continuously injecting at and downstream of a boundary location through a plurality of longitudinally spaced injection openings into said second zone, oxidizing gases comprising free oxygen in the range of 20 to 100 weight percent of said oxidizing gases, thereby forming an oxidizing atmosphere having at least 20 percent excess oxygen in said second zone downstream of said boundary location;

introducing a reactant hydrocarbon along the axis of said first zone;

initiating the formation of carbon black from said reactant hydrocarbon by pyrochemical action due to the heat of the surrounding gases upstream of said boundary location;

passing carbon black and reactant hydrocarbon axially across said boundary location;

continuing the formation of carbon black in said oxidizing atmosphere in said second zone downstream of said boundary location;

producing between 20 and 80 percent of the total conversion to carbon black upstream of said boundary location;

producing between 80 and 20 percent of the total conversion to carbon black downstream of said boundary location; and recovering said carbon black by separation from gaseous products.

6. A process for producing carbon black, which comprises:

establishing in a generally cylindrical first zone, having a diameter greater than its length, a rotating mass of hot gases, said gases forming a non-oxidizing atmosphere;

continuously passing said gases while rotating into a generally cylindrical second zone, having a length greater than its diameter and a diameter less than that of said first zone;

continuously injecting into a third zone having a diameter greater than its length and greater than the diameter of said second zone, a rotating mass of an oxidizing gas;

continuously passing the gases from said second zone into said third zone;

continuously passing the gases from said third zone into a fourth zone having a length greater than its diameter and a diameter less than that of said third zone;

introducing a reactant hydrocarbon along the axis of said first zone;

initiating the formation of carbon black from said reactant hydrocarbon by pyrochemical action due to heat of the surrounding gases in said first and second zones;

continuously injecting an oxidizing gas into said third zone thereby forming an oxidizing atmosphere in said third and fourth zones;

passing carbon black and reactant hydrocarbon from said second zone into said third zone;

continuing the formation of carbon black in an oxidizing atmosphere in said third and fourth zones; and recovering said carbon black by separation from gaseous products.

7. A process for producing carbon black, which comprises:

establishing in a generally cylindrical first zone, having a diameter greater than its length, a rotating mass of hot gases, said gases forming a reducing atmosphere having at least 20 percent excess fuel;

continuously passing said gases while rotating into a generally cylindrical second zone, having a length greater than its diameter and a diameter less than that of said first zone;

continuously passing the gases from said second zone into a third zone, having a diameter greater than its length and greater than the diameter of said second zone;

continuously injecting into said third zone a rotating mass of an oxidizing gas;

continuously passing the gases from said third zone while rotating into a fourth zone having a length greater than its diameter and a diameter less than that of said third zone, thereby establishing an oxidizing atmosphere in said third and fourth zones, said atmosphere comprising at least 20 percent excess oxygen;

introducing a reactant hydrocarbon along the axis of said first zone;

initiating the formation of carbon black from said reactant hydrocarbon by pyrochemical action due to the heat of the surrounding gases in said first and second zones;

passing carbon black and reactant hydrocarbon from said second zone into said third zone;

continuing the formation of carbon black in said third and fourth zones in said oxidizing atmosphere;

producing between 20 and 80 percent of the total conversion to carbon black in said first and second zones and between 80 and 20 percent of the total conversion to carbon black in said third and fourth zones; and recovering said carbon black by separation from gaseous products.

8. A process for producing carbon black, which comprises:

establishing in a generally cylindrical first zone, having a diameter greater than its length, a rotating mass of hot gases, said gases forming a reducing atmosphere having at least 20 percent excess fuel;

continuously passing said gases from said first zone while rotating into a generally cylindrical second zone, having a length greater than its diameter and a diameter less than that of said first zone;

continuously passing the gases from said second zone into a third zone having a diameter greater than its length and greater than the diameter of said second zone;

continuously injecting into said third zone a rotating mass of oxidizing gas thereby forming an oxidizing atmosphere having at least 20 percent excess oxygen;

continuously passing the gases from said third zone while rotating into a fourth zone having a length greater in its diameter and a diameter less than that of said third zone;

continuously injecting an oxidizing gas into said second zone through a plurality of openings spaced longitudinally along said second zone;

introducing a reactant hydrocarbon on the axis of said first zone;

initiating the formation of carbon black from said reactant hydrocarbon by pyrochemical action due to the heat of the surrounding gases in said reducing atmosphere in said first and second zones;

continuing the formation of carbon black in an oxidizing atmosphere in said third and fourth zones;

producing between 20 and 80 percent of the total conversion to carbon black in a reducing atmosphere;

producing between 80 and 20 percent of the total conversion to carbon black in an oxidizing atmosphere; and recovering said carbon black by separation from gaseous products.

9. A furnace for producing carbon black comprising:
a first generally cylindrical chamber having a diameter greater than its length;
a second generally cylindrical chamber having a length greater than its diameter and a diameter less than that of said first chamber, said second chamber being in communication with and in axial alignment with said first chamber;
a third chamber having a diameter greater than its length and greater that the diameter of said second chamber, in communication with and in axial alignment with said third chamber;
a fourth chamber having a length greater than its diameter and a diameter less than that of sad third chamber, said fourth chamber being in communication with and in axial alignment with said third chamber;
means for introducing a reactant hydrocarbon along the axis of said first chamber;
means for introducing a hot nonoxidizing gas tangentially into said first chamber; and
means for introducing an oxidizing gas tangentially into said third chamber.

10. A process for producing carbon black which comprises converting a hydrocarbon reactant into carbon black by:
continuously introducing said reactant into a first reaction zone;
maintaining said reactant in contact only with a nonoxidizing gas in said first zone;
producing carbon black from said reactant in said first zone by the addition of heat from hot gases in said zone, between 20 and 80 percent of the total conversion to carbon black occurring in said first zone;
continuously passing the products from said first zone into a second reaction zone;
maintaining said products in contact with an oxidizing gas in said zone;
producing carbon black from said products in said second zone, between 80 and 20 percent of the total conversion to carbon black occurring in said second zone; and
recovering said carbon black from gaseous products.

11. A process for producing carbon black, which comprises converting a hydrocarbon reactant into carbon black by:
establishing in a generally cylindrical first zone a rotating mass of hot gases, said gases forming a non-oxidizing atmosphere;
continuously passing said gases while rotating into a generally cylindrical second zone;
continuously injecting into said second zone an oxidizing gas comprising free oxygen;
introducing a reactant hydrocarbon along the axis of said first zone;
producing carbon black from said reactant hydrocarbon in said first zone by reaction in a reducing atmosphere, between 20 and 80 percent of the total conversion to carbon black occurring in said first zone;
passing products produced in said first zone, including carbon black, axially into said second zone;
producing carbon black from said products in said second zone, between 80 and 20 percent of the total conversion to carbon black occurring in said second zone; and
recovering said carbon black by separation from gaseous products.

12. A process for producing carbon black which comprises:
establishing a generally cylindrical first zone, having a diameter greater than its length, a rotating mass of hot gases, said gases forming a non-oxidizing atmosphere;
continuously passing said gases while rotating into a generally cylindrical second zone, having a length greater than its diameter and a diameter less than that of said first zone;
continuously injecting oxidizing gases at a boundary location into said zone, thereby forming an oxidizing atmosphere in said second zone downstream of said boundary location;
introducing a reactant hydrocarbon along the axis of said first zone;
initiating the formation of carbon black from said reactant hydrocarbon by pyrochemical action due to the heat of the surrounding gases upstream of said boundary location;
passing carbon black and reactant hydrocarbon axially into said second zone;
continuing the formation of carbon black in an oxidizing atmosphere in said second zone downstream of said boundary location;
producing between 20 and 80 percent of the total conversion to carbon black upstream of said location;
producing between 80 and 20 percent of the total conversion to carbon black downstream of said boundary location; and
recovering said carbon black by separation from gaseous products.

References Cited by the Examiner

UNITED STATES PATENTS

| | | | |
|---|---|---|---|
| 2,419,565 | 4/1947 | Krejci | 23—209.6 |
| 2,852,345 | 9/1958 | Rushford | 23—209.6 X |
| 3,009,784 | 11/1961 | Krejci | 23—209.4 |
| 3,076,695 | 2/1963 | Claassen et al. | 23—209.4 |
| 3,103,418 | 9/1963 | Krejci | 23—209.4 |

MAURICE A. BRINDISI, *Primary Examiner.*